(12) United States Patent
Aoki et al.

(10) Patent No.: US 8,580,705 B2
(45) Date of Patent: Nov. 12, 2013

(54) EXHAUST GAS PURIFYING CATALYST

(75) Inventors: Yuki Aoki, Nissin (JP); Takeru Yoshida, Toyota (JP); Shingo Sakagami, Kakegawa (JP); Masaaki Kawai, Kakegawa (JP); Miho Hatanaka, Nagakute (JP); Toshitaka Tanabe, Nagakute (JP); Naoki Takahashi, Nagoya (JP)

(73) Assignees: Toyota Jidosha Kabushiki Kaisha, Toyota-shi, Aichi-ken (JP); Cataler Corporation, Shizuoka-ken (JP); Kabushiki Kaisha Toyota Chuo Kenkyusho, Nagakute-shi, Aichi-ken (JP)

( * ) Notice: Subject to any disclaimer, the term of this patent is extended or adjusted under 35 U.S.C. 154(b) by 0 days.

(21) Appl. No.: 13/520,363

(22) PCT Filed: Dec. 23, 2010

(86) PCT No.: PCT/IB2010/003344
§ 371 (c)(1),
(2), (4) Date: Oct. 22, 2012

(87) PCT Pub. No.: WO2011/080567
PCT Pub. Date: Jul. 7, 2011

(65) Prior Publication Data
US 2013/0029838 A1   Jan. 31, 2013

(30) Foreign Application Priority Data

Jan. 4, 2010   (JP) ................................ 2010-000165

(51) Int. Cl.
B01J 23/10   (2006.01)
(52) U.S. Cl.
USPC ........................................................ 502/304

(58) Field of Classification Search
USPC .................................................. 502/304, 252
See application file for complete search history.

(56) References Cited

U.S. PATENT DOCUMENTS

| | | | |
|---|---|---|---|
| 4,806,519 A | * | 2/1989 | Chiba et al. .................... 502/252 |
| 2006/0217263 A1 | * | 9/2006 | Kawamoto et al. ........... 502/304 |

(Continued)

FOREIGN PATENT DOCUMENTS

| | | |
|---|---|---|
| EP | 1 520 616 A1 | 4/2005 |
| EP | 1 704 910 A2 | 9/2006 |

(Continued)

OTHER PUBLICATIONS

International Search Report in International Application No. PCT/IB2010/003344; Mailing Date: May 26, 2011.

(Continued)

*Primary Examiner* — Colleen Dunn
*Assistant Examiner* — Haytham Soliman
(74) *Attorney, Agent, or Firm* — Finnegan, Henderson, Farabow, Garrett & Dunner, LLP

(57) ABSTRACT

An exhaust gas purifying catalyst includes a substrate that defines an exhaust gas passage; a lower catalyst layer formed over the substrate, and an upper catalyst layer formed over the lower catalyst layer. The lower catalyst layer has a lower catalytic precious metal that contains at least one of Pt and Pd, and a lower-layer carrier that supports the lower catalytic precious metal. The upper catalyst layer has an upper catalytic precious metal that contains Rh, and an upper-layer carrier that supports the upper catalytic precious metal. The upper-layer carrier includes an inorganic mixed oxide that contains Ce, Zr, Al, Nd, and at least one element selected from the group consisting of rare earth elements other than Ce and alkaline earth elements. The Nd is unevenly distributed in covering layers that covers surfaces of interior regions within the inorganic mixed oxide.

10 Claims, 4 Drawing Sheets

(56) References Cited

U.S. PATENT DOCUMENTS

2008/0269046 A1* 10/2008 Minoshima et al. .......... 502/304
2010/0227757 A1   9/2010 Hatanaka et al.

FOREIGN PATENT DOCUMENTS

| | | |
|---|---|---|
| EP | 1 712 279 A2 | 10/2006 |
| EP | 1 726 359 A1 | 11/2006 |
| EP | 1 985 354 A1 | 10/2008 |
| EP | 2 130 582 A1 | 12/2009 |
| JP | 6-63403 | 3/1994 |
| JP | 2000-510761 | 8/2000 |
| JP | 2003-170047 | 6/2003 |
| JP | 2006-263582 | 10/2006 |
| JP | 2006-297372 | 11/2006 |
| WO | WO 2008/000449 A2 | 1/2008 |
| WO | WO 2010/001215 A2 | 1/2010 |

OTHER PUBLICATIONS

Written Opinion of the International Searching Authority in International Application No. PCT/IB2010/003344; Mailing Date: May 26, 2011.

Applicant's Response in International Application No. PCT/IB2010/003344 (Oct. 20, 2011).

Applicant's Response in International Application No. PCT/IB2010/003344 (Apr. 11, 2012).

* cited by examiner

F I G . 1
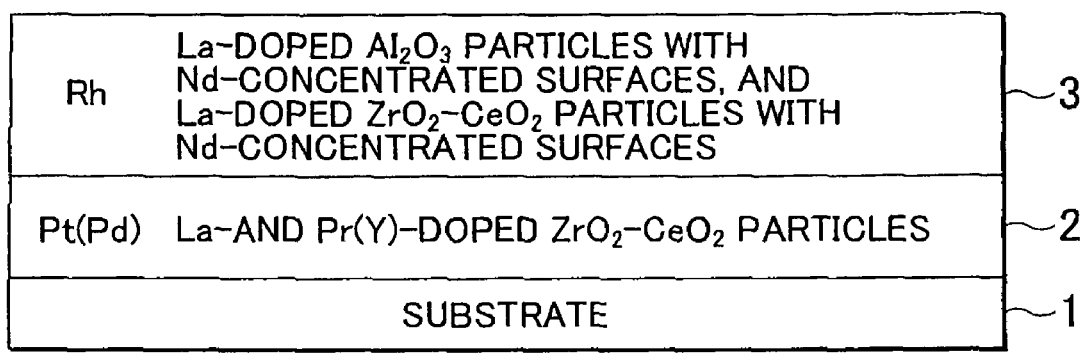

RELATIONSHIP BETWEEN $CeO_2$
CONCENTRATION OF Rh CARRIER AND
Rh PROPORTION OF UPPER CATALYST LAYER

RELATIONSHIP BETWEEN $CeO_2$
CONCENTRATION OF Rh CARRIER AND
HC 50% PURIFICATION TEMPERATURE

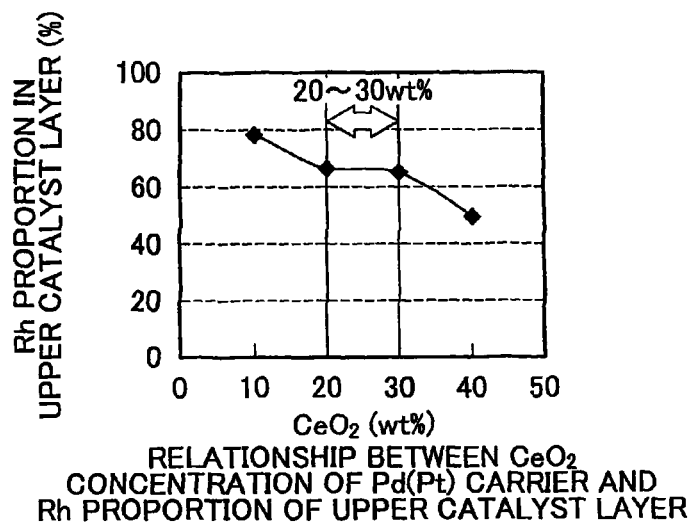
FIG. 7  RELATIONSHIP BETWEEN $CeO_2$ CONCENTRATION OF Pd(Pt) CARRIER AND Rh PROPORTION OF UPPER CATALYST LAYER
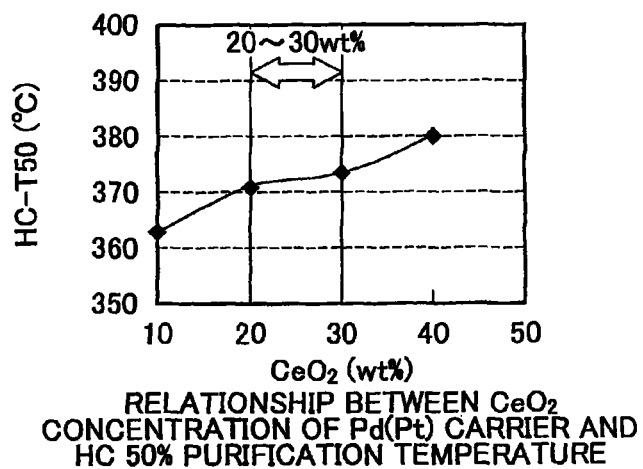
FIG. 8  RELATIONSHIP BETWEEN $CeO_2$ CONCENTRATION OF Pd(Pt) CARRIER AND HC 50% PURIFICATION TEMPERATURE
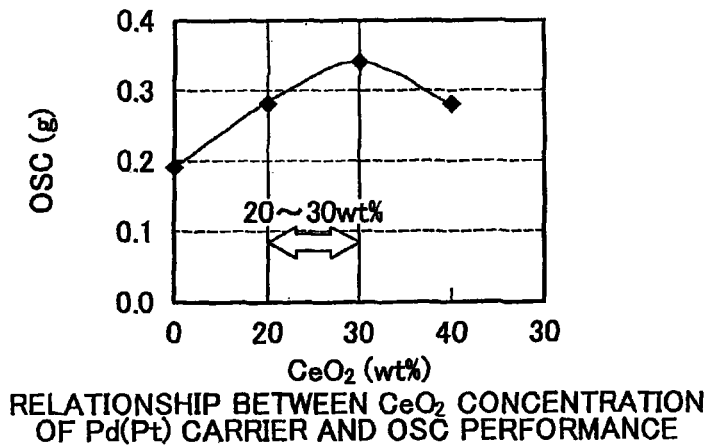
FIG. 9  RELATIONSHIP BETWEEN $CeO_2$ CONCENTRATION OF Pd(Pt) CARRIER AND OSC PERFORMANCE

EXHAUST GAS PURIFYING CATALYST

CROSS-REFERENCE TO RELATED APPLICATIONS

This application is a national phase application of International Application No. PCT/IB2010/003344, filed Dec. 23, 2010, and claims the priority of Japanese Application No. 2010-000165, filed Jan. 4, 2010, the content of both of which is incorporated herein by reference.

BACKGROUND OF THE INVENTION

1. Field of the Invention

The present invention relates to an exhaust gas purifying catalyst that supports catalytic precious metals such as Rh (rhodium), Pt (platinum) and Pd (palladium).

2. Description of the Related Art

Exhaust gas purifying catalysts that purify exhaust gas from automobiles generally includes a catalyst layer formed on the surface of a substrate. The catalyst layer is comprised of a precious metal catalyst such as Rh, Pt and Pd, and a carrier that supports the precious metal catalyst. When exhaust gas passes through the catalyst layer, exhaust gas components are purified on the precious metal catalyst. To effectively optimize catalytic performance of the precious metal catalyst, upstream and downstream catalyst layers may be formed, or a plurality of catalyst layers may be on a substrate.

For example, Example 1 of Published Japanese Translation of PCT application No. 2000-510761 (JP-A-2000-510761) is a catalyst in which an upstream catalyst layer and a downstream catalyst layer are formed upstream and downstream, respectively, in a gas passage. The downstream catalyst layer is further separated into a lower catalyst layer that is formed on the surface of a substrate, and an upper catalyst layer that is formed on the surface of the lower catalyst layer. In Example 1 of JP-A-2000-510761, the upstream catalyst layer supports Pd, the lower catalyst layer of the downstream catalyst layer supports Pd/Pt, and the upper catalyst layer thereof supports Pt/Rh.

When high temperature exhaust gas discharged from an engine passes through the above-described catalyst, however, Rh supported on the upper catalyst layer tends to migrate to the lower catalyst layer or is susceptible to sintering.

Conventionally, $CeO_2$ (ceria) is often added to a catalyst layer. Ceria is able to store oxygen under an oxidizing atmosphere and releases the oxygen under a reducing atmosphere (hereinafter referred to as OSC). Thus, ceria may be used maintain a stable oxygen concentration in exhaust gas passing through the catalyst layer to improve the catalyst activity. In particular, large amount of ceria are often incorporated into the lower catalyst layer, where the oxygen concentration is apt to become low.

However, Rh contained in the upper catalyst layer tends to migrate to ceria in the lower catalyst layer due to the strongly basic nature of ceria. Therefore, when the Rh-containing upper catalyst layer is provided over the ceria-containing lower catalyst layer is exposed to a high temperature atmosphere, Rh is apt to the ceria that is contained in the lower catalyst layer.

The migration of Rh migration results in a lack of Rh in the upper catalyst layer which has a greater contact rate with exhaust gas. Additionally, when Rh is alloyed with the Pt contained in the lower catalyst layer, the purifying performance of both Rh and Pt is reduced.

In this circumstance, Japanese Patent Application Publication No. H06-63403 (JP-A-H06-63403) describes solid-dissolving Ce (cerium) and Nd (neodymium) in $ZrO_2$ (zirconia) to suppress the migration of Rh between layers.

Japanese Patent Application Publication No. 2003-170047 (JP-A-2003-170047) describes supporting Rh and Ba (barium) on a Ce.Zr.Nd composite oxide to suppress sintering of Rh.

Even if cerium and neodymium are solid-dissolved in zirconium oxide as described in JP-H-06-63403, however, it is not possible to sufficiently suppress migration of Rh from the upper catalyst layer to the lower catalyst layer.

The migration of Rh is believed to be due to competition between the force to retain Rh in the upper catalyst layer and the force to attract Rh to the lower catalyst layer. Therefore, optimizing the balance between properties of the upper-layer carrier to retain Rh in the upper catalyst layer and properties of the lower-layer carrier to attract Rh to the lower catalyst layer.

However, when Rh and Ba are supported on a Ce.Zr.Nd composite oxide as proposed in JP-2003-170047, sintering of Rh is not be sufficiently suppressed and, hence, it is not possible to obtain a sufficient purification performance for hydrocarbons (HC), carbon monoxide (CO) and nitrogen oxides (NOx).

SUMMARY OF THE INVENTION

The present invention provides an exhaust gas purifying catalyst that suppresses migration and sintering of Rh and has an excellent exhaust gas purification performance.

The exhaust gas purifying catalyst according to the present invention comprises a substrate that defines a gas passage through which an exhaust gas flows, a lower catalyst layer that is formed on a surface of the substrate, and an upper catalyst layer that is formed on a surface of the lower catalyst layer, and is characterized in that the lower catalyst layer includes a lower catalytic precious metal which contains at least one of Pt and Pd, and a lower-layer carrier that supports the lower catalytic precious metal, that the upper catalyst layer includes an upper catalytic precious metal which contains Rh, and an upper-layer carrier that supports the upper catalytic precious metal, that the upper-layer carrier includes an inorganic mixed oxide that contains Ce, Zr, aluminum (Al), Nd, and at least one element selected from the group consisting of rare earth elements other than Ce and alkaline earth elements, that the inorganic mixed oxide has interior regions, and cover layers that cover surfaces of the respective interior regions, and that the Nd is unevenly distributed in the covering layers.

The above described exhaust gas purifying catalyst has a lower catalyst layer that contains at least one of Pt and Pd, and an upper catalyst layer that contains Rh. The amount of Rh that is supported on an upper-layer carrier of the upper catalyst layer is preferably 0.1 to 0.3 g per liter of the substrate. The upper catalyst layer mainly performs reduction purification of NOx in the exhaust gas using Rh. Namely, in the presence of Rh, HC in the exhaust gas undergoes hydrogen reforming to generate hydrogen which, in turn, reduces and purifies NOx in the exhaust gas by its reducing power.

On the other hand, CO that is contained in the exhaust gas has a relatively small molecular structure and has a relatively high diffusion rate. For this reason, CO can swiftly diffuse in the lower catalyst layer that is disposed beneath the upper catalyst layer. Therefore, Pt and/or Pd that are supported in the lower catalyst layer can oxidize and purify mainly CO and HC.

The upper-layer carrier that supports Rh includes an inorganic mixed oxide containing Ce, Zr, Al, Nd, and at least one element selected from the group consisting of rare earth elements other than Ce and alkaline earth elements. The inorganic mixed oxide has interior regions and surface layers (or covering layers). The Nd in the upper-layer carrier shows a strong interaction with Rh and has a strong Rh attracting force. Since the Nd is unevenly distributed in the surface layers of the inorganic mixed oxide, Rh is present very close to the Nd. Therefore, Rh attracting force of the Nd can be effectively operated. Therefore, when exposed to a high temperature, Rh is held and retained in the upper catalyst layer and is supported in a highly dispersed state. Namely, the migration of Rh to the lower catalyst layer can be suppressed and the alloying of Rh with Pt or Pd in the lower catalyst layer can be suppressed. Further, Pt or Pd in the lower catalyst layer can effectively utilized for the purification of HC and CO.

It is preferred that the inorganic mixed oxide of the upper-layer carrier contain $CeO_2$ in an amount of 10 to 20% by mass. It is also preferred that a $CeO_2$ concentration in the entire upper catalyst layer be 5 to 16% by mass. When the concentration of $CeO_2$ is in the above ranges, it is possible to achieve sufficient OSC performance (oxygen storage performance) while sufficiently attaining the NOx purification performance inherent to Rh.

It is preferred that the lower-layer carrier includes particles of a composite oxide that contains $CeO_2$ and a metal oxide or oxides other than $CeO_2$ and that a $CeO_2$ concentration in the composite oxide particles be 20 to 30% by mass. Further, a $CeO_2$ concentration in the entire lower catalyst layer is preferably 10 to 24% by mass and the lower catalyst layer preferably has a thickness of 25 to 50 In the above cases, because the $CeO_2$ concentration in the composite oxide particles of the lower-layer carrier is relatively small, the property of the $CeO_2$ in the composite oxide particles of the lower-layer carrier to attract the Rh in the upper catalyst layer is weak. It is, therefore, possible to further suppress the migration of Rh to the lower catalyst layer and to suppress the alloying of Rh with Pt or Pd that is contained in the lower catalyst layer. Additionally, the catalyst can exhibit excellent purifying performance at low temperatures and the OSC performance (oxygen storage performance) of $CeO_2$ is high.

According to the exhaust gas purifying catalyst of the present invention, since Rh is supported on the inorganic mixed oxide in which Nd is unevenly distributed in its surface layers, it is possible to suppress the migration of Rh and to retain Rh in a highly dispersed state. Therefore, the catalyst has an excellent exhaust gas purifying performance.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a cross-sectional view of the exhaust gas purifying catalyst according to Example 1;

FIG. 7 is a diagram showing the changes in Rh proportions in the upper catalyst layers when $CeO_2$ concentration in the composite oxide particles of the lower-layer carriers is varied;

FIG. 8 is a diagram showing the changes of $HC_{50}$ purification temperatures of catalysts when $CeO_2$ concentration in the composite oxide particles of the lower-layer carriers is varied; and FIG. 9 is a diagram showing the changes in OSC performance of the catalysts when $CeO_2$ concentration in the composite oxide particles of the lower-layer carriers is varied.

DETAILED DESCRIPTION OF EMBODIMENTS

Figure 2:
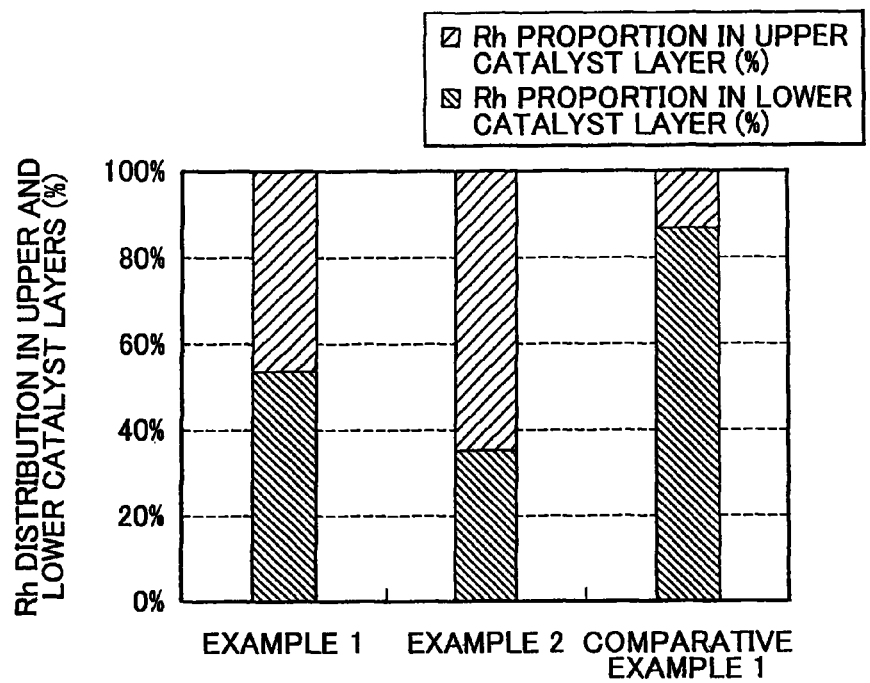
FIG. 2 is a diagram showing the concentration of Rh in upper catalyst layers of Examples 1 and 2 and Comparative Example 1 measured in Measurement 1.

The exhaust gas purifying catalyst of the present invention has a substrate, a lower catalyst layer and an upper catalyst layer.

The substrate defines a gas passage and may be shaped into various forms such as a honeycomb shape, a foam shape or a plate shape. The material of which the substrate is formed is not particularly limited and may be a known material such as a ceramic, e.g. cordierite or SiC, or a metal.

The lower catalyst layer is formed on the surface of the substrate and has a lower catalytic precious metal and a lower-layer carrier on which the lower catalytic precious metal is supported.

The lower catalytic precious metal contains at least one of Pt and Pd. If desired, the lower catalytic precious metal may contain other precious metal catalysts such as Rh, as long as the performance of Pt and Pd is not adversely affected.

Preferably, the total concentration of Pt and Pd that are supported on the lower catalyst layer is 0.5 to 1.5 g per liter of the substrate, because CO and HC oxidation purification performance of Pt and Pd may be improved. As used herein, the term "per liter of the substrate" is intended to mean "per liter of the entire bulk volume of the substrate that includes not only the true volume of the substrate but also the volume of void space that is formed within the substrate". If the interior of the substrate is divided into a plurality of cells, the term "per liter of the substrate" means "per liter of the entire bulk volume that includes the true volume of the substrate and the volume of the cells. Incidentally, the term "cell" refers to a hollow portion that constitutes the gas passage.

The lower-layer carrier supports the lower catalytic precious metal and may include particles of a composite oxide that contains $CeO_2$ and at least one other metal oxide. The $CeO_2$ serves as an oxygen storage and releasing material. When the composite oxide particles of the lower-layer carrier contain $CeO_2$, therefore, OSC performance can be achieved so that a stable oxygen concentration may be maintained in the exhaust gas to facilitate the purification performance of the catalyst.

Further, the composite oxide particles of the lower-layer carrier suitably contain both $CeO_2$ and $ZrO_2$. In this case, it is desired that $CeO_2$ and $ZrO_2$ form a solid solution to suppress thermal deterioration of $CeO_2$.

Preferably, the $CeO_2$ concentration in the composite oxide particles of the lower-layer carrier is 20 to 30% by mass. The Rh supported on the upper catalyst layer tends to be attracted to $CeO_2$ which is strongly basic. Therefore, by reducing the $CeO_2$ concentration in the composite oxide particles of the lower-layer carrier to a level below what is conventionally used, it is possible to suppress migration of Rh from the upper catalyst layer to the lower catalyst layer.

If the $CeO_2$ concentration in the composite oxide particles of the lower-layer carrier is below 20% by mass, OSC performance becomes insufficient. In contrast, if the $CeO_2$ concentration in the composite oxide particles of the lower-layer carrier exceeds 30% by mass, Rh may mograte from the upper catalyst layer to the lower catalyst layer.

The proportion of $CeO_2$ relative to $ZrO_2$ in the composite oxide particles of the lower-layer carrier is preferably 28 to 50% by mass because migration of Rh from the upper catalyst layer may be suppressed while achieving sufficient OSC performance.

The composite oxide particles of the lower-layer carrier may additionally contain at least one rare earth element oxide. Examples of the rare earth element include scandium (Sc), yttrium (Y), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). To improve the stability of the composite oxide particles of the lower-layer carrier, it is preferable that at least one of Y and La be contained therein.

Preferably, $ZrO_2$—$CeO_2$ composite oxide of the lower-layer carrier is doped with particles of La— and Y, to improve the OSC performance of the lower-layer carrier and suppress migration of Rh, so that overall catalytic activity is improved.

In addition to the lower catalytic precious metal and the lower-layer carrier, the lower catalyst layer may contain an additional carrier component such as $Al_2O_3$ particles. The inclusion of $Al_2O_3$ particles in the lower catalyst layer improves the adhesion strength between the lower catalyst layer and the upper catalyst layer.

The lower catalyst layer may further contain Ba in addition to the lower catalytic precious metal the lower-layer carrier and the additional carrier component such as $Al_2O_3$ particles.

The overall concentration of $CeO_2$ in the lower-layer carrier, including any additional components, should preferably remain between 20 to 30% by mass. In addition, the concentration of $CeO_2$ in the entire lower catalyst layer is preferably 10 to 24% by mass. Accordingly, excellent OSC performance of the lower-layer carrier is obtainable, migration of Rh can be effectively suppressed, and a high catalytic activity can be achieved.

To achieve sufficient catalytic activity, the lower catalyst layer preferably has a thickness of 25 to 50 μm.

The upper catalyst layer formed over the lower catalyst layer has an upper catalytic precious metal and an upper-layer carrier on which the upper catalytic precious metal is supported.

The upper catalytic precious metal contains at least Rh. Preferably, the concentration of Rh in the upper-layer carrier is 0.1 to 0.3 g per liter of the substrate. If the concentration of Rh supported on the upper-layer carrier is less than 0.1 g/L, NOx purification performance by Rh may be reduced. If the amount of Rh supported on the upper-layer carrier exceeds 0.3 g/L, however, the activity of Rh reaches saturation and, therefore, the excess Rh would simply increase costs.

If desired, the upper catalytic precious metal may contain other precious metal catalysts such as Pd, as long as the performance of Rh is not adversely affected. Pt should not be contained in the upper catalytic precious metal to prevent Rh from forming an alloy with Pt.

The upper-layer carrier is a carrier that supports the upper catalytic precious metal and includes an inorganic mixed oxide that contains Ce, Zr, Al, Nd and at least one element which is selected from the group consisting of rare earth elements other than Ce and alkaline earth elements. In the inorganic mixed oxide of the upper-layer carrier, at least one element which is selected from rare earth elements other than Ce may be the same as the rare earth element that may be optionally contained in the lower catalyst layer.

In the inorganic mixed oxide of the upper-layer carrier, Ce and Zr may, be solid-dissolved in each other to form a composite oxide. When such a composite oxide is formed, the resulting inorganic mixed oxide exhibits a high OSC performance. However, Al in the inorganic mixed oxide exists as alumina and forms primary particles that differ from primary particles of ceria, zirconia and/or their composite oxide. Because the primary particles interfere with each other and aggregate to form secondary particles, the aggregation of the same oxide is prevented from occurring. If Rh is supported on the inorganic mixed oxide in which Nd is unevenly present in surface layers (or covering layers) of these primary particles, a high dispersion of Rh may be maintained and migration of Rh can be prevented, even when the catalyst is exposed to a high temperature oxidizing atmosphere.

The reason for this may be twofold. First, in a high temperature oxidizing atmosphere, Rh is stabilized by Rh—O—Nd bonds so that migration and grain growth of Rh are suppressed. Second, the fact that both $Nd_2O_3$ and $Rh_2O_3$ have a crystal structure of a hexagonal system contributes to the suppression of the migration of Rh.

An inorganic mixed oxide that has the above-described structure may be prepared using a method such as coprecipitation, for example. In coprecipitation, a mixed aqueous solution containing nitrates of elements such as Ce and Zr that constitute first particles and nitrates of elements such as Al that constitute second particles is prepared. Ammonia water or the like is added to this solution to precipitate an oxide precursor. The oxide precursor is then calcined to form secondary particles in which the first particles and second particles are mixed to form a mixed aggregate. The second particles are then mixed in an aqueous solution of neodymium nitrate, stirred and then calcined. As a result, Nd may be distributed unevenly on the surfaces of the first and second particles that form the secondary particles.

Preferably, the $Nd_2O_3$ concentration in the inorganic mixed oxide of the upper-layer carrier is 0.50 to 6% by mass, more preferably 1 to 6% by mass, so that high dispersion of Rh may be maintained and migration of Rh may be prevented.

Preferably, the $CeO_2$ concentration in the inorganic mixed oxide of the upper-layer carrier is 10 to 20% by mass to ensure that high catalytic activity of Rh may be achieved while also ensuring satisfactory OSC performance.

In addition to the upper-layer carrier, the upper catalyst layer may contain an additional carrier component such as $Al_2O_3$ particles.

The overall concentration of the inorganic mixes oxide in the upper-layer carrier, including any additional components, is preferably 50 to 80% by mass. In addition, the concentration of the inorganic mixed oxide in the entire upper catalyst layer is preferably 50 to 80% by mass. Accordingly, migration of Rh may be effectively suppressed.

The overall concentration of $CeO_2$ in the lower-layer carrier, including any additional components, should preferably remain 10 to 20% by mass. In addition, the concentration of $CeO_2$ in the entire upper catalyst layer is preferably 5 to 16% by mass. Accordingly, the concentration of $CeO_2$ in the amounts indicated also effectively suppress migration of Rh.

The upper catalyst layer may be formed over the entire surface of the lower catalyst layer, which extends from its upstream end to its downstream end. Alternatively, however, the upper catalyst layer may be formed over only a part of the surface of the lower catalyst layer. When the upper catalyst layer is formed over only a part of the surface of the lower catalyst layer, the upper catalyst layer may be suitably formed over an area that extends from an intermediate portion of the surface of the lower catalyst layer to the downstream end thereof. In this case, a catalyst layer that supports Pd may be formed on the remainder area that extends from the upstream end of the surface of the lower catalyst layer to the intermediate portion thereof.

To form the lower catalyst layer on a surface of the substrate, a slurry of a carrier powder that includes the lower-layer carrier is first wash-coated on the surface of the substrate, which is followed by the supporting of the lower catalytic precious metal on the coated lower-layer carrier. Alternatively, a slurry of a catalyst powder containing a carrier powder on which the lower catalytic precious metal is supported may be wash-coated on the substrate.

To form the upper catalyst layer over the lower catalyst layer, a slurry of a carrier powder including the upper-layer carrier is first wash-coated on the surface of the lower catalyst layer, and followed by the supporting of the upper catalytic precious metal on the coated upper-layer carrier. Alternatively, a slurry of a catalyst powder containing carrier powder on which the upper catalytic precious metal is supported may be wash-coated on the lower catalyst layer.

The exhaust gas purifying catalyst of the present invention may be used, for example, as a three-way catalyst. The three-way catalyst simultaneously oxidizes HC and CO, and reduces NOx present in the exhaust gas.

The present invention will now be concretely described by way of examples and comparative examples. Example 1 is first described. An exhaust gas purifying catalyst according to Example 1 includes, as shown in FIG. 1, a substrate 1, a lower catalyst layer 2 formed on the substrate 1, and an upper catalyst layer 3 that is formed over the lower catalyst layer 2. The substrate 1 is a monolith substrate that has a volume of 875 cc and a honeycomb structure which is made of cordierite. The inside of the substrate 1 is divided by partition walls into a plurality of cells, with each cell being provided with a gas passage. The lower catalyst layer 2 is over the partition walls that define the cells, and the upper catalyst layer 3 is formed over the lower catalyst layer 2.

The lower catalyst layer 2 includes a lower catalytic precious metal, a lower-layer carrier, La-doped $Al_2O_3$, $BaSO_4$ and an $Al_2O_3$ binder. The lower catalytic precious metal is Pt. The concentration of Pt in the substrate is 0.50 g per liter. The lower-layer carrier includes composite oxide particles of La- and Pr-doped $CeO_2$—$ZrO_2$. The composite oxide particles of the lower-layer carrier has a composition of 60% $CeO_2$/30% $ZrO_2$/3% $La_2O_3$/7% $Pr_2O_3$ by mass. The composite oxide particles of the lower-layer carrier has a $CeO_2$ concentration of 60% by mass. The overall concentration of $CeO_2$ in the lower-layer carrier, including the La-doped $Al_2O_3$, is 45% by mass.

The amounts of respective components coated on the lower catalyst layer 2 on the substrate are 120 g/L in the case of the composite oxide particles, 40 g/L in the case of the La-doped $Al_2O_3$, 10 g/L in the case of $BaSO_4$ and 3 g/L in the case of the $Al_2O_3$ binder.

The upper catalyst layer 3 includes an upper catalytic precious metal, an upper-layer carrier, La-doped $Al_2O_3$ and an $Al_2O_3$ binder. The upper catalytic precious metal is Rh. The concentration of Rh in the substrate is 0.15 g per liter. The upper-layer r carrier includes an inorganic mixed oxide of Nd.Al.Ce.Zr.La. The inorganic mixed oxide of the upper-layer carrier has a composition of 2% $Nd_2O_3$/51% $Al_2O_3$/20% $CeO_2$/25% $ZrO_2$/2% $La_2O_3$ by mass.

The amounts of respective components coated on the upper catalyst layer 3 are 60 g/L in the case of the inorganic mixed oxide, 25 g/L in the case of the La-doped $Al_2O_3$ and 3 g/L in the case of the $Al_2O_3$ binder. The concentration of the inorganic mixed oxide of the upper-layer carrier is 70.6% by mass based on the total mass of the inorganic mixed oxide and the La-doped $Al_2O_3$. The concentration of the inorganic mixed oxide in the upper catalyst layer is 68.2% by mass.

The inorganic mixed oxide of the upper-layer carrier has a $CeO_2$ concentration of 20% by mass. The concentration of $CeO_2$ relative to the inorganic mixed oxide plus the La-doped $Al_2O_3$ is 14.1% by mass. The upper catalyst layer has a $CeO_2$ concentration of 13.6% by mass.

To prepare the exhaust gas purifying catalyst, the composite oxide particles of the lower-layer carrier were prepared as follows. Cerium nitrate, zirconium oxynitrate, lanthanum nitrate, praseodymium nitrate as raw materials were dissolved in pure water to obtain a 0.3M precursor solution. Aqueous ammonia that was diluted with pure water was the added dropwise to the precursor solution. The mixture was stirred with a homogenizer. Water was then removed by centrifuge to collect precipitates. The precipitates were dried at 150° C. for 7 hours, pre-calcined at 400° C. for 5 hours and then calcined at 700° C. for 5 hours to effect crystallization. The product was then ground with a blender into a powder, to obtain a powder containing the composite oxide particles of La- and Pr-doped $CeO_2$—$ZrO_2$.

The resulting composite oxide particles were immersed in an aqueous solution of platinum nitrate. This was calcined to support platinum on the composite oxide particles. Next, a slurry (A) was formed by blending the Pt-supporting composite oxide particles, $BaSO_4$, La-doped $Al_2O_3$ and an $Al_2O_3$ binder and applied to a surface of the substrate 1. The coated slurry (A) was dried and calcined to form the lower catalyst layer 2.

To prepare the upper-layer carrier, aluminum nitrate, cerium nitrate, zirconium oxynitrate and lanthanum nitrate as raw materials were dissolved in pure water to obtain a 0.3M precursor solution. Aqueous ammonia diluted with pure water was the added dropwise to the precursor solution. The mixture was stirred with a homogenizer.

Water was then removed by centrifuge to collect precipitates. The precipitates were dried at 150° C. for 7 hours, pre-calcined at 400° C. for 5 hours and then calcined at 900° C. for 5 hours to effect crystallization. The product was ground with a blender into a powder. This powder is formed of secondary particles in which first particles of La-doped $CeO_2$—$ZrO_2$ and second particles of La-doped $Al_2O_3$ form a mixed aggregate.

The resulting powder was mixed with an aqueous solution of neodymium nitrate and stirred. After the stirring, the mixture was dried at 120° C. for 4 hours and calcined at 900° C. for 5 hours, thereby to obtain the inorganic mixed oxide in the form of powder in which Nd segregated to surface layers (or covering layers) of the first and second particles.

The resulting inorganic mixed oxide was immersed in an aqueous solution of rhodium nitrate. This was calcined so that rhodium is supported on the inorganic mixed oxide. Next, a slurry (B) was formed by blending the Rh-supporting inorganic mixed oxide, La-doped $Al_2O_3$ and an $Al_2O_3$ binder and then applied to the surface of the lower catalyst layer 2. The coated slurry (B) was dried and calcined to form the upper catalyst layer 3.

Example 2 is next described. An exhaust gas purifying catalyst of Example 2 differs from that of Example 1 in that the composition in terms of mass ratio of composite oxide particles of a lower-layer carrier of Example 2 is 30% $CeO_2$/ 60% $ZrO_2$/5% $La_2O_3$/5% $Y_2O_3$ by mass. With the exception of difference in composition of the composite oxide particles of the lower-layer carrier, the producing method in Example 2 was the same as that in Example 1.

Comparative Example 1 is next described. An exhaust gas purifying catalyst of Comparative Example 1 differs from that of Example 1 in that Y-doped $Nd_2O_3$—$ZrO_2$—$CeO_2$ is used as an upper-layer carrier. The upper-layer carrier has a mass ratio of 20% $CeO_2$/59% $ZrO_2$/12% $Nd_2O_3$/9% $Y_2O_3$ and was in the form of composite oxide particles in which respective oxide components were solid-dissolved in each other and uniformly distributed. Other constitutions were the same as in Example 1.

A method for preparing the exhaust gas purifying catalyst of Comparative Example 1 will be described next. First, a slurry (A) that was prepared in Example 1 is applied to the surface of the substrate 1 to form a lower catalyst layer that was similar to the lower catalyst layer of Example 1.

Next, composite oxide particles of the upper-layer carrier were prepared as follows. Cerium nitrate, zirconium oxynitrate, neodymium nitrate and yttrium nitrate as raw materials were dissolved in pure water to obtain a 0.3M precursor solution. Aqueous ammonia diluted with pure water was the added dropwise to the precursor solution. The mixture was stirred with a homogenizer. Water was then removed by centrifuge to collect precipitates. The precipitates were dried at 150° C. for 7 hours, pre-calcined at 400° C. for 5 hours and then calcined at 700° C. for 5 hours to effect crystallization. The product was ground with a blender into a powder, thereby to obtain a power containing the composite oxide particles of containing Ce, Zr, Nd and Y in the form of powder.

The resulting inorganic mixed oxide was immersed in an aqueous solution of rhodium nitrate. This was calcined so that rhodium is supported on the inorganic mixed oxide. Next, a slurry (C) was prepared by blending the Rh-supporting composite oxide particles, La-doped $Al_2O_3$ and an $Al_2O_3$ binder.

The slurry (C) was applied to a surface of the lower catalyst layer. The coated slurry (C) was dried and calcined to form the lower catalyst layer.

The compositions of the upper-layer carrier and lower-layer carrier in Examples 1 and 2 and Comparative Example 1 are summarized in Table 1.

In Measurement 1, each of the catalysts of Examples 1 and 2 and Comparative Example 1 was exposed to an exhaust gas stream from a V-type 8-cylinder engine (3UZ-FE) and subjected to a durability test at a catalyst bed temperature of 1,000° C. for 50 hours.

A cross-section of each of the catalyst after the durability test was photographed by EPMA (electron probe micro analyzer). The images of the catalyst cross-section photographs were then analyzed to calculate the Rh distribution in the upper catalyst layer and lower catalyst layer. The results are shown in FIG. 2.

As seen in FIG. 2, the Rh proportion in the upper catalyst layer was found to be higher in the catalysts of Examples 1 and 2 than in the catalyst of Comparative Example 1. This is considered to be attributed to the fact that because Nd is unevenly present in the surface layers of the inorganic mixed oxide of the upper-layer carrier, Rh is attracted to Nd and is prevented from migrating to the lower catalyst layer 2.

Further, the Rh proportion in the upper catalyst layer was found to be higher in Example 2 than in Example 1. This is considered to be attributed to the fact that because the $CeO_2$ concentration in the lower-layer carrier of the lower catalyst layer of Example 2 is reduced, Rh that is contained in the upper catalyst layer is less attracted to $CeO_2$ in the lower-layer carrier and is retained in the upper catalyst layer. Namely, the prevention of migration of Rh contained in the upper catalyst layer is best achieved by conjoint use of the specific inorganic mixed oxide of the upper-layer carrier and the specific composite oxide particles of the lower-layer carrier.

Next, in Measurement 2, a 50% purification temperature of each of the catalysts of Examples 1 and 2 and Comparative Example 1 was measured. Each of the catalyst after the above-described durability test was installed in an exhaust system of an in-line 4-cylinder 2.4 L engine. A theoretical air-to-fuel ratio mixture, that is a stoichiometric air-fuel ratio mixture, is combusted in the engine. The exhaust gas from the engine was allowed to pass through each catalyst as the temperature of the catalyst is increased from 200° C. to 450° C. at a rate of 10° C. per minute using a heat exchanger. Gas components contained in the gas entering the catalyst and the gas exiting from the catalyst were analyzed during the temperature increase of the catalyst to measure the purification rates of HC, CO and NOx. From the results, the temperatures at which 50% of the respective components were purified were calculated. The calculated temperatures are shown in FIG. 3 as "50% purification temperature ($HC_{50}$, $CO_{50}$, NOx50 temperature)".

Figure 3:
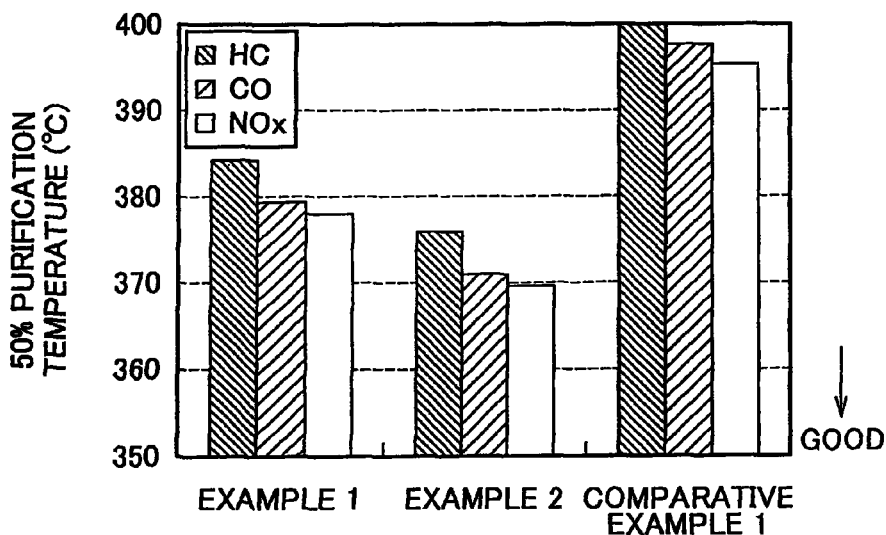
FIG. 3 is an explanatory diagram that shows $HC_{50}$, $CO_{50}$ and $NOx50$ (HC 50%, CO 50% and NOx 50%) purification temperatures that were attained by the catalysts of Examples 1 and 2 and Comparative Example 1 measured in Measurement 1.

As seen in FIG. 3, the $HC_{50}$, $CO_{50}$, $NOx_{50}$ temperatures of the catalysts according to Examples 1 and 2 were lower than the $HC_{50}$, $CO_{50}$, $NOx_{50}$ temperatures of the catalysts according to Comparative Example 1. Further, the catalyst of Example 2 shows lower $HC_{50}$, $CO_{50}$, $NOx_{50}$ temperatures than the catalyst of Example 1. From the results obtained in Measurements 1 and 2, it is apparent that the lower $HC_{50}$, $CO_{50}$, $NOx_{50}$ temperatures may be achieved when Rh migration is reduced. The prevention of Rh migration and lower $HC_{50}$, $CO_{50}$, $NOx_{50}$ temperatures of the catalyst are superior when inorganic oxide particles in which Nd is unevenly distributed in its surface layers (Examples 1 and 2) as compared to when $Nd_2O_3$ is uniformly dispersed in the composite oxide particles (Comparative Example 1). This is considered to be attributed to the fact that because Nd is unevenly distributed in the surface layers of the inorganic mixed oxide of the upper-layer carrier, Rh is efficiently interacts with Nd so that migration of Rh is effectively prevented and sintering of Rh may be suppressed.

Further, still better results are obtained by reducing the $CeO_2$ concentration in the composite oxide of the lower-layer carrier (Example 2). It is believed that due to the lower concentration of $CeO_2$ content in the composite oxide particles of the lower-layer carrier than in the case of Example 1, Rh contained in the upper catalyst layer is less influenced by and less attracted to the lower catalyst layer.

In Examples 1 and 2 and Comparative Example 1, Pt is used as a lower catalytic precious metal of the lower catalyst layer. Even if Pd is used in place of Pt or together with Pt, similar results were obtained in Measurements 1, 2 and 3.

Figure 4:
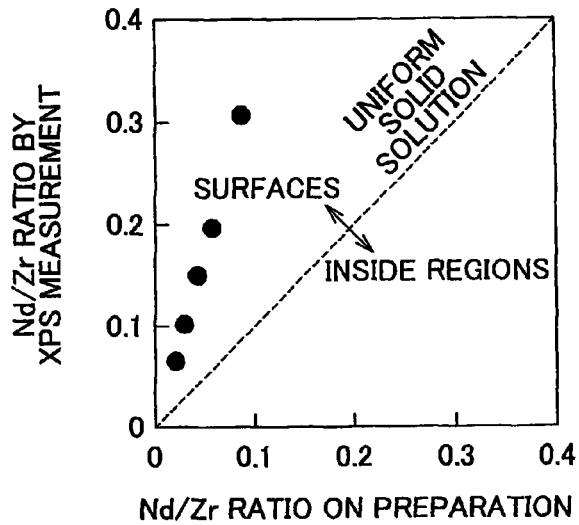
FIG. 4 is a diagram that shows a relationship between the Nd/Zr ratio used in preparing an inorganic mixed oxide of an upper-layer carrier and the ratio of Nd/Zr which of the inorganic mixed oxide.

A Nd/Zr ratio in surface layers of the inorganic mixed oxide of the upper-layer carrier will be described. Five types of inorganic mixed oxides for use as the upper-layer carrier were prepared by varying the composition. Each inorganic mixed oxide was measured by XPS (X-ray photoelectron spectroscopy) measurement to determine the composition of the surface layers thereof. In FIG. 4, the Nd/Zr ratio as measured by the XPS measurement is plotted on the Y axis, while the Nd/Zr atomic ratio calculated from the amounts of the neodymium nitrate and zirconium nitrate used to prepare the upper-layer carrier is plotted on the X axis.

The dotted line in FIG. 4 represents the case where the Nd/Zr that is calculated from the amounts used for the preparation matches the Nd/Zr that is measured by the XPS measurement. Thus, if the coordinates of a point are located near to those on the dotted line, the composition which is used for the preparation would be nearly the same as that of the surface layers, namely Nd would be uniformly dispersed in the powder. However, the coordinates of the five kinds of the inorganic mixed oxides are all above the dotted line. Therefore, it is seen that Nd is unevenly present in the surface layers of the inorganic mixed oxide.

The $CeO_2$ concentration in the upper catalyst layer will be described. Except for changing composition of the upper-layer carrier, catalysts were prepared in the same manner as described in Example 1. As shown in Table 2, the $CeO_2$ concentration in the inorganic mixed oxides of the upper-layer carriers of Comparative Example 2, Example 3 and Example 4 were 0% by mass, 10% by mass and 20% by mass, respectively. The $CeO_2$ and $ZrO_2$ concentration in the inorganic mixed oxides of the upper-layer carriers were varied, without altering the concentrations of the other components.

Figure 5:
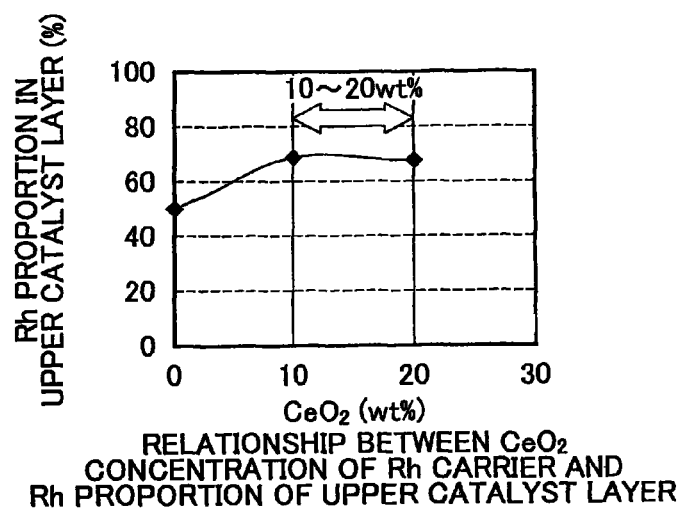
FIG. 5 is a diagram showing the changes in Rh proportions in the upper catalyst layers when the $CeO_2$ concentration in the inorganic mixed oxides of the upper-layer carriers is varied.
Figure 6:
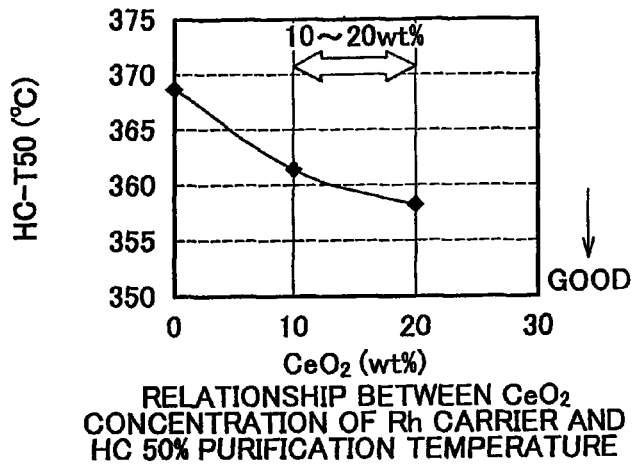
FIG. 6 is a diagram that shows changes of $HC_{50}$ purification temperatures of catalysts when $CeO_2$ concentration in the inorganic mixed oxides of the upper-layer carriers is varied.

Using these upper-layer carriers, catalysts were prepared. In the same manner as that in Measurements 1 and 2, the Rh proportion in the upper catalyst layer and the $HC_{50}$ purification temperature of each of the thus prepared catalysts were measured. The Rh proportions in the upper catalyst layer of the catalyst prepared in Comparative Example 2, Example 3 and Example 4 are shown in FIG. 5 and the $HC_{50}$ purification temperature thereof are shown in FIG. 6. The results of the $CO_{50}$ and $NOx_{50}$ temperature measurements were found to be similar to those of the $HC_{50}$ purification temperature measurement.

As is evident from FIG. 5 and FIG. 6, in comparison with Comparative Example 2, the proportion of Rh in the upper catalyst layer is greater while the $HC_{50}$ temperature is lower in Examples 3 and 4 in which the $CeO_2$ concentration in the inorganic mixed oxide of the upper-layer carrier is 10 to 20% by mass. Thus, it is apparent that the catalysts of Examples 3 and 4 exhibit improved catalytic activity.

The Rh proportion of the upper catalyst layer and $HC_{50}$ temperature were not measured when the $CeO_2$ concentration exceeds 20% by mass. It is possible that the Rh activity decreases because Rh is shifted nearer to the oxide when the $CeO_2$ concentration exceeds 20% by mass.

The $CeO_2$ concentration in the lower catalyst layer will be described next. Except for changing composition of the lower-layer carrier of the lower catalyst layer, the catalysts were prepared in the same manner as described in Example 1. As shown in Table 3, the $CeO_2$ concentration in the composite oxide particles of the lower-layer carriers of Samples 1, 2, 3 and 4 were 10% by mass, 20% by mass, 30% by mass and 40% by mass, respectively. The $CeO_2$ and $ZrO_2$ concentrations in the composite oxide particles of the lower-layer carriers were varied, while the concentration of the other components were maintained constant.

Catalysts were prepared using the above lower-layer carriers. In the same manner as that in Measurements 1 and 2, the Rh proportion in the upper catalyst layer and the $HC_{50}$ temperature of each of the thus prepared catalyst were measured. The Rh proportions in the upper catalyst layer of the catalysts prepared in Samples 1 to 4 are shown in FIG. 7 and the $HC_{50}$ temperatures thereof are shown in FIG. 8.

The oxygen occlusion amount (OSC performance) of the catalysts was also measured. Each catalyst was subjected to the durability test in the same manner as that in Measurement 1. After the durability test each catalyst was installed in the exhaust system of a 2.4L engine. The oxygen concentration in the exhaust gas at a catalyst bed temperature of 780° C. and an air to fuel ratio (A/F) of in the range of 14 to 15 was continuously measured. The amount of oxygen generated when the air to fuel ratio decreases is shown in FIG. 9 as the oxygen occlusion amount.

As shown in FIG. 7, Sample 4, in which the $CeO_2$ concentration in the composite oxide particles of the lower-layer carrier is 40% by mass, has a considerably reduced Rh proportion in the upper catalyst layer.

Thus, as shown in FIG. 8, the $HC_{50}$ temperature of Sample 4, in which the $CeO_2$ concentration in the composite oxide particles of the lower-layer carrier is 40% by mass, is high. This is believed to be due to the high concentration of $CeO_2$ in the composite oxide particles of the lower-layer carrier, Rh in the upper catalyst layer migrates to the lower catalyst layer, which reduces the catalytic activity of Rh of the upper catalyst layer.

With regard to the OSC performance of catalyst, however, Sample 1, in which the $CeO_2$ concentration in the composite oxide particles of the lower-layer carrier is 10% by mass, shows occlusion of an insufficient amount of oxygen as shown in FIG. 9.

From the results shown in FIG. 7 to FIG. 9, it is apparent that Samples 2 and 3, in which the $CeO_2$ concentration in the composite oxide particles of the lower-layer carrier is 20 to 30% by mass, show significant improvement in catalytic activity and OSC performance

TABLE 1

| Catalyst | Upper Carrier (supporting Rh) | Lower Carrier (supporting Pt (Pd)) |
|---|---|---|
| Example 1 | $Nd_2O_3/Al_2O_3/CeO_2/ZrO_2/La_2O_3$ = 2/51/20/25/2 (wt %) | $CeO_2/ZrO_2/La_2O_3/Pr_6O_{11}$ = 60/30/3/7 (wt %) |
| Example 2 | ↑ | $CeO_2/ZrO_2/La_2O_3/Y_2O_3$ = 30/60/5/5 (wt %) |
| Comparative Example 1 | $CeO_2/ZrO_2/Nd_2O_3/Y_2O_3$ = 20/59/12/9 (wt %) | $CeO_2/ZrO_2/La_2O_3/Pr_6O_{11}$ = 60/30/3/7 (wt %) |

TABLE 2

| Upper Carrier | $CeO_2$ (wt %) | $Nd_2O_3$ (wt %) | $ZrO_2$ (wt %) | $La_2O_3$ (wt %) | $Al_2O_3$ (wt %) |
|---|---|---|---|---|---|
| Comparative Example 2 | 0 | 2 | 46 | 2 | 50 |
| Comparative Example 3 | 10 | 2 | 36 | 2 | 50 |
| Comparative Example 4 | 20 | 2 | 26 | 2 | 50 |

TABLE 3

| Lower Carrier | $CeO_2$ (wt %) | $ZrO_2$ (wt %) | $La_2O_3$ (wt %) | $Y_2O_3$ (wt %) |
|---|---|---|---|---|
| Sample 1 | 10 | 80 | 5 | 5 |
| Sample 2 | 20 | 70 | 5 | 5 |
| Sample 3 | 30 | 60 | 5 | 5 |
| Sample 4 | 40 | 50 | 5 | 5 |

The invention claimed is:

1. An exhaust gas purifying catalyst comprising:
    a substrate that defines a gas passage through which an exhaust gas flows;

a lower catalyst layer that is formed on a surface of the substrate; and an upper catalyst layer that is formed on a surface of the lower catalyst layer, wherein the lower catalyst layer includes a lower catalytic precious metal comprised of at least one of Pt and Pd, and a lower-layer carrier that supports the lower catalytic precious metal;

wherein the upper catalyst layer includes an upper catalytic precious metal which contains Rh, and an upper-layer carrier that supports the upper catalytic precious metal, wherein the upper-layer carrier comprises an inorganic mixed oxide that contains Ce, Zr, Al, Nd, and at least one element selected from the group consisting of rare earth elements other than Ce;

wherein the inorganic mixed oxide has interior regions containing a mixed aggregate composed of first particles comprising Ce and Zr in a form of a composite oxide, and second particles comprising Al in a form of alumina, and has cover layers containing Nd that cover surfaces of the respective interior regions, and wherein the Nd is unevenly distributed in the cover layers.

2. The exhaust gas purifying catalyst according to claim 1, wherein
the inorganic mixed oxide of the upper-layer earner has a $CeO_2$ concentration of 10 to 20% by mass.

3. The exhaust gas purifying catalyst according to claim 1, wherein
the $CeO_2$ concentration in the entire upper catalyst layer is 5 to 16% by mass.

4. The exhaust gas purifying catalyst according to claim 1, wherein
0.1 to 0.3 g of Rh per liter of the substrate is supported on the upper-layer carrier of the upper catalyst layer.

5. The exhaust gas purifying catalyst according to claim 1, wherein
the lower-layer carrier comprises particles of a composite oxide that contains $CeO_2$ and a metal oxide other than $CeO_2$, wherein the lower-layer carrier has a $CeO_2$ concentration of 20 to 30% by mass.

6. The exhaust gas purifying catalyst according to claim 1, wherein
a $CeO_2$ concentration in the entire lower catalyst layer is 10 to 24% by mass.

7. The exhaust gas purifying catalyst according to claim 1, wherein
the lower catalyst layer has a thickness of 25 to 50 μm.

8. The exhaust gas purifying catalyst according to claim 1, wherein the inorganic mixed oxide is prepared using a coprecipitation method, in which
a mixed aqueous solution containing nitrates of Ce and Zr constituting the first particles and nitrates of Al constituting the second particles is prepared, in which
ammonia water is added to this solution to precipitate an oxide precursor, in which
the oxide precursor is then calcined to form secondary particles in which the first particles and second particles are mixed to form a mixed aggregate, and in which
the secondary particles are then mixed in an aqueous solution of neodymium nitrate, stirred and then calcined,
so that the Nd is unevenly distributed on the surfaces of the first and second particles.

9. The exhaust gas purifying catalyst according to claim 1, wherein the Nd is unevenly distributed on the surfaces of the first and second particles.

10. The exhaust gas purifying catalyst according to claim 1, wherein in the upper-layer carrier, the Nd is concentrated in the covers layers.

* * * * *